Dec. 18, 1962 J. B. MURRAY ETAL 3,068,655

MOBILE PNEUMATIC BREAKWATER

Filed Dec. 1, 1959 5 Sheets-Sheet 1

Dec. 18, 1962 J. B. MURRAY ETAL 3,068,655

MOBILE PNEUMATIC BREAKWATER

Filed Dec. 1, 1959 5 Sheets-Sheet 2

United States Patent Office 3,068,655

Patented Dec. 18, 1962

3,068,655

MOBILE PNEUMATIC BREAKWATER

John B. Murray, North Tarrytown, and Kurt H. B. Posselt, Huntington, N.Y., and Tillman P. Long, Gulfport, Miss., assignors to Standard Dredging Corporation, New York, N.Y., a corporation of Delaware Filed Dec. 1, 1959, Ser. No. 856,502
15 Claims. (Cl. 61—6)

This invention relates to the calming of waters in harbors and in other areas requiring protection of installations or equipment subject to the destructive and otherwise disturbing actions of waves created by winds or tides or both. It has heretofore been suggested that such calming of waters may be brought about by the creation of a wall or screen of air bubbles through the release of air bubbles under suitable pressure at a suitable distance below the surface of the water. In accordance with the present invention this principle is applied through the use of apparatus which may be produced and installed economically, may be operated at a minimum expense, and may be readily transported from one position to another to meet the requirements of a particular situation.

While the invention is adaptable to a wide variety of uses, it has been developed for particularly advantageous use in connection with the dredging of channels or the like in harbors and unprotected waters which are subject to wave motions of such magnitude as to interfere seriously with the proper performance of the dredging operations. It has been found that in such operations any substantial wave movements directed against the dredging equipment interfere seriously with the conduct of the work and greatly reduce the efficiency of the operation. Methods and means have long been sought for the economical and efficient elimination of the difficulties resulting from wave movements in the performance of such dredging operations. One factor which has complicated the problem is the necessity of providing means for this purpose which may be readily shifted from one position to another as the dredging operations progress over a large area of a harbor or the like. Similar situations are encountered in other cases in which it is necessary to calm the waters in a number of different areas of an expanse of water. It is frequently desirable, for example, to calm the surface in widely scattered areas of a body of water to enable the safe and smooth landing of aircraft, such as hydroplanes, in the vicinity of a vessel which may be shifted from one station to another. Other situations in which the mobility of a unit or system for calming waters is of importance will occur to those familiar with the problems involved.

One difficulty in connection with the problem to which the present invention is directed is the need for the provision of wave calming means which is capable of economical operation and is at the same time of such construction so as to be readily rendered effective for its intended purpose and is also readily rendered easily transportable from one position to another.

In accordance with the present invention the various problems indicated have been solved by the provision of a unit capable of producing an efficient and effective air bubble screen for the calming of waters over a large area, the unit being equipped with a simple means for floating it at will so that it may readily be transported from one position to another and may then be readily submerged and caused to rest upon the bottom of a harbor or the like so as to be effective for its intended purpose. Moreover, the construction as a whole must be such that it will not interfere with the free movement of ships through the harbor, in the course of prolonged dredging operations for example.

A feature of the invention is the provision of a long, relatively lightweight, but durable pipeline which may be used effectively as a means for alternately floating and sinking the devices required for producing the desired air screen. This pipeline, which may be of any required length, say 100 to 1000 feet or more, must be of sufficiently sturdy construction to withstand wave action and tidal currents when floating at the surface of the water. The pipeline, when the apparatus is in its operative position, is adapted to rest upon the bottom of the harbor and the apparatus carried by the pipeline for the production of the air screen must not project upwardly from the latter to such an extent as to interfere with the free passage of ships of the character the harbor is designed to receive. It will be appreciated that the bottom of the harbor upon which the pipeline rests is of irregular contour, in elevation, and that the pipeline must be capable of conforming with these irregularities or of spanning depressions or cavities in the surface upon which it rests without subjecting the pipe to undue strains.

When the pipeline is submerged it is filled with water and when it is to be shifted it is filled with air from a compressor unit. This air which displaces the water must be supplied under a pressure somewhat greater than the hydrostatic pressure of the water to be dislodged and to expedite operations should be substantially greater. The capacity of the pipeline must be sufficient to provide the necessary buoyancy, when it is filled with air, to lift it, and the equipment which it carries, to the surface of the water so that at least the upper portion of the line is exposed above the water level to enable the equipment to be readily transported from one location to another. Toward this end the invention contemplates the provision of relatively lightweight structure on the pipeline for the production of the desired air screen and for retaining such means firmly in proper position. Moreover, the center of gravity of the pipeline and its equipment must be such that the air screen producing devices will extend upwardly as required for proper performance. As will be explained, the pipeline is formed in sections having ball joint connections so that the location of the center of gravity becomes important, otherwise one or more of the sections may turn about the ball joints at their ends and discharge the air downwardly rather than upwardly.

A further feature of the invention is the provision of means in the overall combination which is adapted to bring about the discharge of air at appropriate periodic intervals at a plurality of points adjacent the bottom of the harbor or the like to produce the desired air screen over an effective area throughout the length of the pipeline. While such an air screen could be produced by the continuous release of air throughout the length of the pipeline, this would require an excessive amount of air to be discharged, thus calling for excessively large compressor units to supply the air and greatly increasing the expense of the operation. It has been found that the desired wave calming or reducing action may be brought about with the intermittent discharge of air, thus greatly reducing the total amount of air required, but the provision of means for producing such intermittent release of air has necessarily added to the overall weight of the equipment which must be floated to make possible the ready transportation of the equipment from one location to another. The present invention has solved all of these problems in an effective and economical manner.

Briefly, the present invention contemplates the use of a barge at the inlet end of the pipeline and a tugboat, or the like, at the opposite end of the line. The barge is equipped with air compressors and power means, such as diesel or gasoline engines, for driving the same and suitable hose lines for supplying air under the required pressure to the main floating and sinking pipeline discussed above and also to the devices for intermittently discharging air to produce the air screen. In some situations it is possible to eliminate the barge and place the compressors and the like on a fixed land structure which may permit movement of the equipment to different points as the location of the pipeline is shifted. The compressors must be capable of delivering air under sufficient pressure to overcome the loss of head in the supply lines and the hydrostatic head of the water at the bottom of the harbor and at an appropriate rate to expel the water from the main pipeline to float the same within a reasonable time interval and to supply air to produce the desired air screen when the system is in operation. It will be understood that air is required for these two purposes at different times so that the capacity of the compressors need be sufficient only to serve one purpose at a time. The boat at the opposite end of the pipeline is provided with a hoist which, through a wire rope or cable having its free end connected with the adjacent end of the pipeline, is adapted to lift this to the surface when it is desired to change the location of the equipment. This end of the pipeline is normally open when the line is submerged, and it may remain open at all times if it is held on the boat after the water has been discharged from it and as it is towed from one location to another. However, the pipeline may be capped off at its end remote from the compressor, after substantially all of the water has been blown out of it, and the equipment may then be towed in its floated condition with the boat at the far end simply assisting in maintaining the pipeline along a relatively straight path.

The means for creating the desired bubble screen may comprise a plurality of so-called "burpers" which are open at their tops and bottoms to admit water but are provided with baffles or partitions to divide the interior into a plurality of different zones. Air introduced into the bottom of the burper serves to expel the main body of water in it and then allows a sudden gush of air to pass upwardly and out at the top of the unit. Water is then permitted to reenter the unit and substantially fill the same under the hydrostatic pressure existing at the depth to which the unit is submerged. Preferably a value is provided in the unit for temporarily preventing the discharge of air when the main chamber of the unit is refilled with water. The continued introduction of air under pressure serves to repeat the operation, so that the unit automatically releases a quantity of air mixed with water at periodic intervals. The frequency of discharge of air may be controlled by regulating in various ways the rate at which the air is introduced into the unit.

Other objects, features and advantages of the invention will appear from the detailed description which will now be given of certain illustrative embodiments of the same shown in the accompanying drawings, in which.

Figure 1:
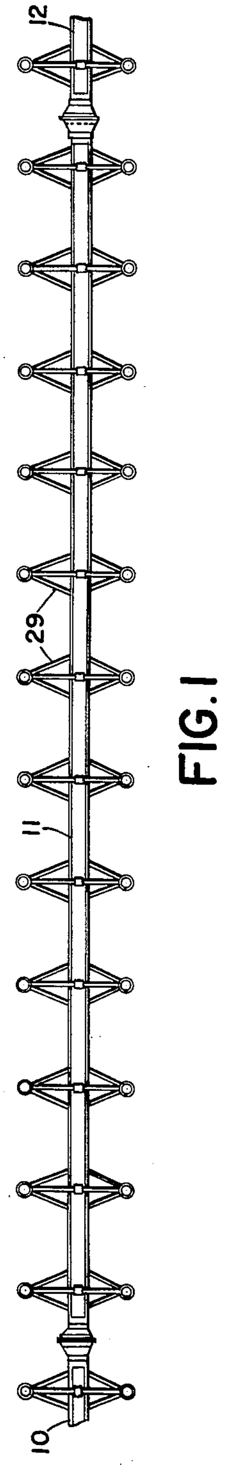
FIG. 1 is a plan view of a portion of a pipeline equipped with the air screen producing units.
Figure 2:
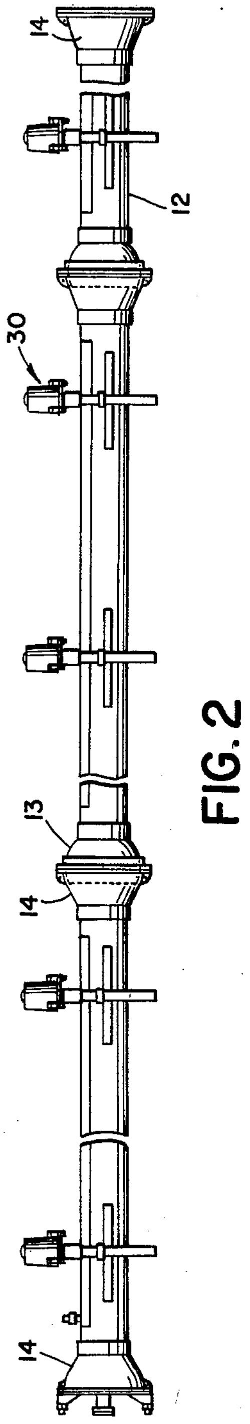
FIG. 2 is an enlarged elevational view of the structure shown in FIG. 1 with substantial portions of the pipeline broken away to condense the view.

Turning now to the drawings, the mobile pneumatic breakwater of the present invention comprises a series of sections of pipe connected together by ball joint couplings to provide a breakwater of any desired length. In FIGS. 1 and 2 portions of three such pipe sections 10, 11 and 12 are shown. Each section may suitably be, say, 96 feet long and may be provided with air bubble releasing units at 8-foot intervals along its length. Any number of such pipe sections may be connected together to form a breakwater of desired length. The main portion of each pipe section may suitably have a diameter of about 18 inches, the pipe being formed of steel plate of suitable thickness, say ¼ inch, to enable the pipeline to withstand the distorting forces mentioned hereinbefore. The pipe should also be of sufficient strength to prevent buckling or serious bending in the course of handling the apparatus.

Figure 3:
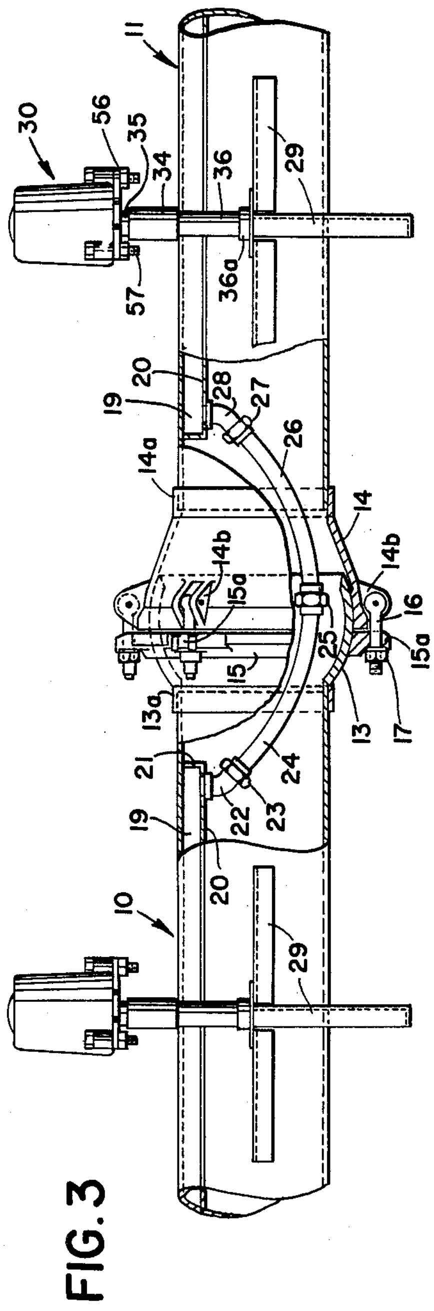
FIG. 3 is an enlarged elevational view of a portion of the pipeline in the region of the ball joint coupling between two sections thereof, portions of the pipe sections and coupling being broken away and shown in section.
Figure 5:
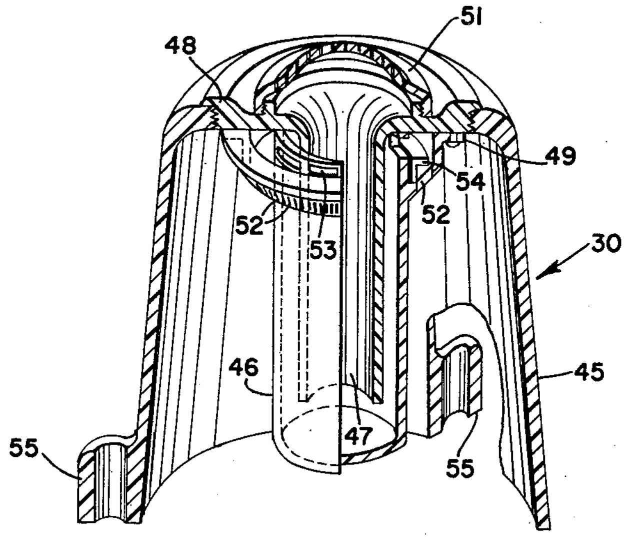
FIG. 5 is a perspective view, partly in section, showing the construction of one of the air releasing units.
Figure 6:
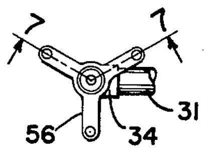
FIG. 6 is a plan view of a spider-like bracket provided for the support of the unit shown in FIG. 5.
Figure 7:
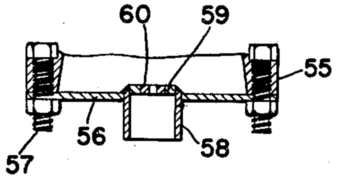
FIG. 7 is a sectional view, along the broken line 7—7 of FIG. 6, showing the connection between the spider-like bracket and the unit of FIG. 5.

At each end of each pipe section there is provided one part of a ball joint coupling consisting of a ball and a bell. The ball portion of the coupling is indicated at 13 and it is provided with a collar **13*a* which is welded to the end of the section 10 of the pipe, for example. Pipe 11 (FIG. 3) carries the bell portion of the coupling shown at 14 which has a collar 14*a* welded to the end of pipe section 11. Obviously the location of the ball and bell portions of the coupling may be reversed if desired. Members 13 and 14 have, respectively, a convex and a concave partial spherical surface arranged to ride upon each other with a substantially air-tight and water-tight fit provided by a rubber gasket. To enable assembly of the coupling and the retention of the parts in assembled relation there is provided a ring 15 having a partial spherical inner surface arranged to ride upon the outer surface of ball member 13. The ring 15 may be formed in two sections to facilitate assembly or it may be formed as a closed ring which is loosely applied to the pipe section 10 or to the member 13 before the latter is welded to the pipe section 10. Member 14 has a plurality of outwardly extending ears 14*b* around its periphery, adjacent pairs of such ears being arranged to pivotally retain an eye bolt 16. Each of these bolts is arranged to have its shank swung into a recess 15*a*, one of which is provided in the periphery of ring 15 in longitudinal alignment with each of the bolts 16. A nut 17 provided on each bolt enables clamping of the ring 15 in appropriate relation to the end of the member 14 to provide a relatively close fit in relation to member 13, but in a manner to permit relative sliding between the cooperating spherical surfaces of member 13 on the one hand, and member 14 and ring 15** on the other hand.

The interior of each pipe section is partitioned off to provide a passage or chamber 19 of suitable cross-sectional area for the delivery of air under pressure to the air bubble releasing units. For this purpose there may be provided a longitudinally extending partition 20 which is suitably welded into the plate structure forming the main pipeline to provide the indicated air passage 19. Vertical partitions 21 at each end of the passage serve to close off the latter from the main passage through the pipe section at a point adjacent each end of the latter. The passage 19 of one pipe section, such as 10 (FIG. 3), is connected to a corresponding passage in the pipe section 11 through an elbow member 22 extending downwardly from the partition 20 and connected by a coupling 23 with a flexible hose line 24 which in turn is connected by a coupling 25 with a flexible hose line 26. The latter is connected by coupling 27 with an elbow member 28 extending downwardly from the partition 20 in the pipe section 11. It will be understood that the flexible hose line 24, 26 permits the two pipe sections to be angled in any direction in relation to each other without disrupting the connection between their passages 19. Similar connections are provided between the passages 19 in the successive pipe sections throughout the length of the main pipeline being employed.

Figure 4:
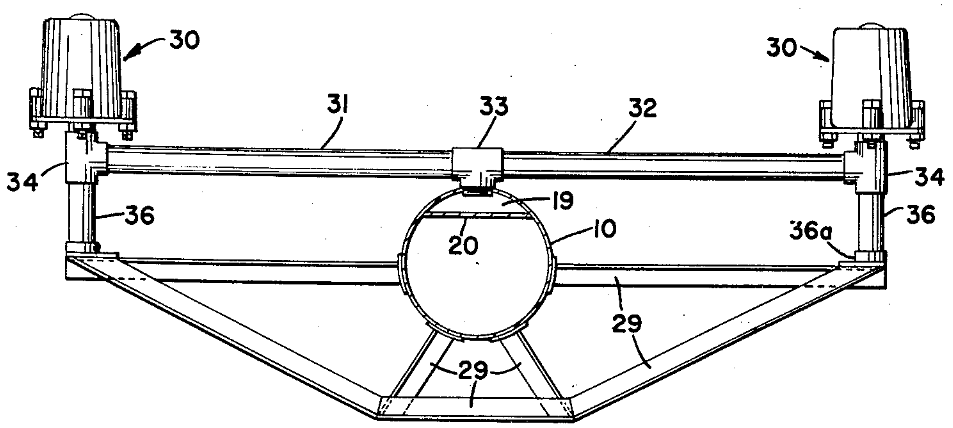
FIG. 4 is a transverse sectional view through the pipeline in the region in which two of the air releasing units are connected therewith and shows such units and the supporting means therefor.

At spaced intervals along each pipe section, say at 8-foot intervals, there is provided a frame structure 29 (FIG. 4) suitably secured to and projecting transversely from the pipe section. This frame structure may be of angle iron construction and, as best shown in FIGS. 1 and 4, has horizontally disposed members arranged to provide a diamond configuration in plan, as shown in FIG. 1. Other members of the frame structure extend downwardly to provide transverse angle members arranged to rest upon the bottom of the harbor or the like when the apparatus is in operative position. At each end of the frame structure, as shown in FIG. 4, there is mounted an air bubble releasing unit 30. These are connected with the air passage 19 by means of pipes 31 and 32 connected with a T-fitting 33 extending through the main pipe section into communication with the passage 19. At their opposite ends the pipes 31 and 32 are provided with T-fittings 34 having upwardly extending short pipes or nipples 35 entering the bottoms of the units 30. Short pipes 36 extend downwardly from the T connections 34 and are secured to the frame structure 29 by members **36*a* having a plate-like base and an upwardly extending collar. The pipes 36** are preferably sealed off at their upper ends by a suitable block or disc so as to eliminate the accumulation of water therein. Various portions of the frame structure are welded together at points of contact to provide a rigidly and firmly connected structure. For a pipe section 96 feet long there may be provided twelve of such frame structures, with those adjacent the ends of the pipe section being disposed 4 feet inwardly from the ends.

Figure 8:
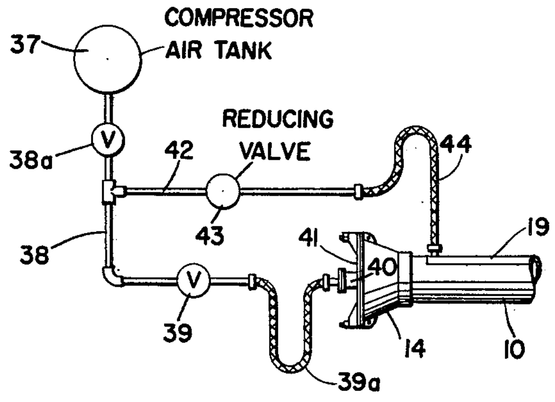
FIG. 8 is a schematic view showing the means for delivering air under pressure to the pipeline and the air releasing units.
Figure 9:
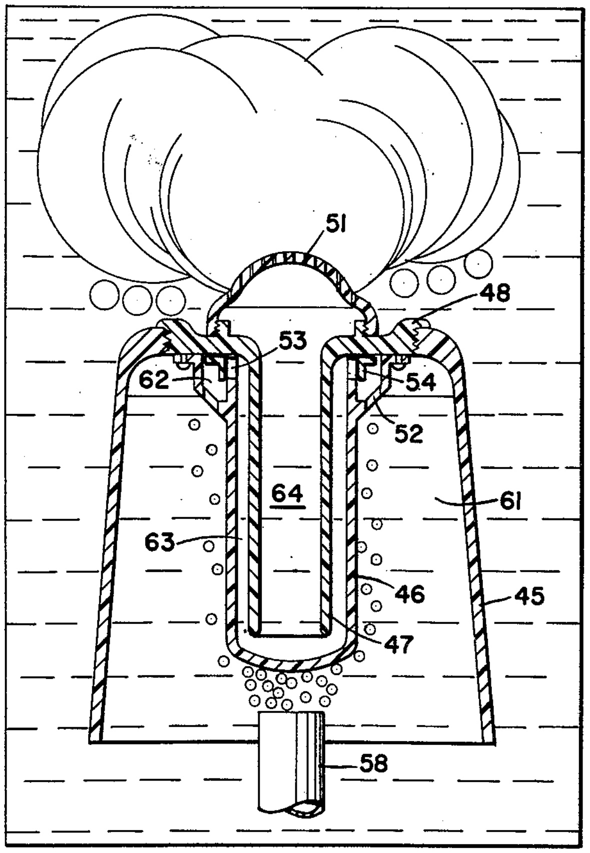
FIG. 9 is a schematic view showing the air bubble discharge unit in section immersed in a body of water represented by the rectangular outline.

Referring now to FIG. 8, a suitable compressor or compressors and an air tank indicated schematically at 37 is mounted either on short or on a barge, as the case may be, at one end of the system. Preferably the air tank 37 is arranged to deliver air under a pressure of about 125 lbs. per sq. in. to a pipe 38 having a valve **38*a* for either closing off or throttling down the delivery of air from the compressor. A valve 39 is also provided in the line 38 for cutting off the delivery of air to the main flotation passage through the pipeline 10, 11, 12, etc. and to permit the release of air from the latter whenever it is desired to sink the pipeline. The end of pipe 38 is connected through a flexible hose line 39*a* of suitable length with the end of pipe section 10, the hose being connected with a fitting 40 at the center of a closure disc 41 clamped to the end of the ball joint member 14. This disc may be secured in place by the bolts 16 previously described. A branch pipe 42, having a pressure reducing valve 43 therein, serves to deliver air to a flexible hose line 44 connected into the passage 19 which, as explained, is connected with the air releasing units 30. When the main pipeline is submerged to a depth of 40–50 feet, or somewhat more, the valve 43** may be adjusted to deliver air at 30 lbs. per sq. in. to the air releasing units. The air compressor system should be capable of supplying air to the units at such pressure at an appropriate rate, which may be about 1500 cu. ft. per minute for a pipeline 500 feet long. This is adequate to create the desired air screen for calming the water under conditions normally encountered. The rate of release may, however, be either increased or decreased to provide the desired calming action for waves of different heights and lengths. In working in deeper harbors where the pipeline must be submerged to a greater extent than indicated above, the air delivered to the releasing units should be under a somewhat higher pressure. It must be under a pressure somewhat in excess of the hydrostatic pressure of the water at the depth to which the units are submerged.

The construction of the units 30 and their mode of operation is illustrated in FIGS. 5 and 9–11, inclusive. Each unit comprises an outer shell 45 of frusto-conical configuration and formed preferably of polyethylene or a similar plastic which is relatively light in weight, resistant to corrosion and capable of withstanding the stresses to which it is subjected. In fact, the entire unit 30 is preferably formed of such a plastic. Centrally disposed within the shell 45 is a cup member 46 which is closed at its bottom. Within the member 46 is provided a tube 47 which is open at its bottom and serves to provide an annular passage between its external surface and the interior of cup member 46. At its upper end, the tube 47 has a laterally extending flange provided with screw thread formations cooperating with similar formations on the shell 30. Cup member 46 has a laterally extending flange 49 which is secured to the portion 48 of member 47 in any suitable way. The flange 49 is formed at the outer end of a skirt-like extension from the member 46 which provides a small chamber at the upper end of said member. Cup member 46 and tube member 47 may be united to form a sub-assembly before application to the shell 45. An axially extending flange 50 carried by member 47 is screw threaded to receive the lower end of a screw threaded, dome shaped, discharge member 51. The latter may be provided with a series of perforations or a series of slots in its dome through which air may be discharged in the manner to be described, and through which water may enter the interior of the tube 47 and the cup 46 at times. The conical skirt toward the upper end of the cup 46 is provided with a series of openings 52 around its circumference to permit the passage of either air or water from within the shell 45 into the small chamber formed by the skirt at the upper end of the cup. Openings 53 through the upper portion of the vertical wall of the cup 46 likewise permit the passage of air into the space between the inner surface of the cup and the outer surface of the tube 47. A ring 54, however, having a laterally extending flange at its top is arranged to close off the ports 53 when the ring is raised into its uppermost position by the action of the water passing through the openings 52 in the manner to be explained. This valve ring is lowered in the course of operation of the unit when the water is forced downwardly by the air.

For mounting the unit 30 on the frame structure of FIG. 4 the shell 45 is provided with three outwardly extending ears 55. These ears are provided with openings arranged to receive bolts 57 by which the shell 45 may be secured to a spider-like bracket 56 arranged to be carried by the pipe or nipple 35. The spider for this purpose is provided with a downwardly extending tube or cup 58 mounted over or within the pipe 35 and welded or otherwise secured thereto. If desired, the cup 58 may be mounted directly within and secured to the upper branch of the T-fitting 34. At its upper end the cup 58 is largely closed off by a disc 59 arranged to receive an air metering element 60 preferably formed of bronze or a suitable plastic. The arrangement is such that metering elements having openings of different diameter may be inserted within the discs 59 of the various air releasing units to thus control the rate of delivery of air into the several units 30. This will enable proper adaptation of the system as a whole to deliver air into the various units at substantially the same rate regardless of the location of the units in relation to the compressor. Those units most remote from the compressor should have somewhat larger openings through the metering elements 60 than the units which are closer to the source of air supply.

The operation of the foregoing system will now be briefly described. When the system is to be set up in a particular area of a harbor, the main pipeline and its connected parts, all susbtantially free of water, will be transported to the desired area by a number of boats and a barge which carries the compressor equipment and possibly the adjacent end of the pipeline. One of the boats may carry the opposite end of the pipeline and additional boats may be required to assist in towing the pipeline and maintaining it in a reasonably straight line. When the desired location is reached the ends of the pipeline will be dropped from the barge and boat carrying the same and the main pipeline will then become filled with water and, as a result of this, sink to the bed of the harbor. A number of boats may be required along the length of the pipeline to maintain it in the desired substantially straight line as it is being submerged. The number of such boats required will depend upon the overall length of the pipeline which may vary from several hundred feet to about 1,000 feet or more.

The direction in which the pipeline is extended and its distance from the dredging equipment, or any other equipment the operation of which is to be protected, will depend upon a variety of circumstances, chiefly the direction from which the waves are approaching the equipment. In all instances the pipeline should, of course, be so disposed that the equipment to be protected is on the lee side of the line. As applied to dredging operations, if the waves are approaching the dredging equipment from a direction at right angles to the channel to be dredged, the pipeline may suitably be disposed about 100 feet from such channel, whereas if the waves are approaching from a direction substantially parallel with the desired channel, the pipeline may be submerged at a distance of say 500 feet from the initial working position of the dredge. In the second situation the dredge in the course of its operation, may be advanced about 400 feet toward the pipeline before it become necessary to float the pipeline and shift it to a new location. Where the waves are approaching the dredge at substantially right angles to the direction of the channel to be dredged, a pipeline 1000 feet in length may permit the dredge to advance from 600 to 800 feet before it is necessary to relocate the pipeline. The frequency with which the pipeline must be floated and relocated thus depends upon the foregoing considerations as well as the length of the pipeline and the character and amount of the material to be removed from the bottom of the harbor to create the desired channel, which determine the speed with which the removal may take place. Other factors will also enter into this phase of the operation, such as the nature of the wave motion to be calmed. The air screen produced in accordance with the invention is more effective on certain types of wave motion, involving a particular relationship between the height and length of the waves, than other types. Also the extent to which the pneumatic breakwater will be effective in the regions adjacent its ends will vary with the character of the waves to be calmed.

It will be understood that the hose lines 39a and 44 will be of sufficient length, say 100 feet or more, so as to extend from the barge to the inlet 40 of the main passage in the pipeline and to the passage 19, respectively, when the pipeline rests on the bed of the harbor at a suitable distance from the barge. The valve 38a may be closed during this period so that no air is delivered from the compressor equipment to any part of the system. However, if desired, the valves 38a and 39 may be opened partially during the towing operation to prevent the entry of water into the passage 19 through the metering elements 60 and also replenish the air which might leak through the ball joints.

In lieu of retaining the far end of the pipeline on a tug or the like, as explained above, in transporting the system to the desired location, the end of the pipeline may simply be closed off by applying a closure plate or cap to the ball joint member 13 or 14 at the far end of the line. If this were of the form of member 14 the closure could be readily retained in the same manner as the disc 41 of FIG. 8. When so applied to the pipeline filled with air it will serve to maintain the water tightness of the main passage through the pipeline so that the latter will float the equipment as a whole and permit it to be readily towed, with the barge at the forward end, to the desired location. One or more boats may, however, be required to maintain the pipeline along the desired path. When the desired location is reached the far end of the pipeline may be hoisted from the water to remove the closure and thus permit the introduction of water as this end of the pipeline is lowered again. It is desirable in the course of this stage of the operation to attach a buoy to the pipeline, adjacent its end, so as to provide a marker for its location. The rope connecting the buoy to the pipeline should be slightly longer than the depth of the water in its area. At the opposite end of the pipeline the barge, which is firmly anchored, will provide an indication as to the approximate location of that end of the line.

Figure 10:
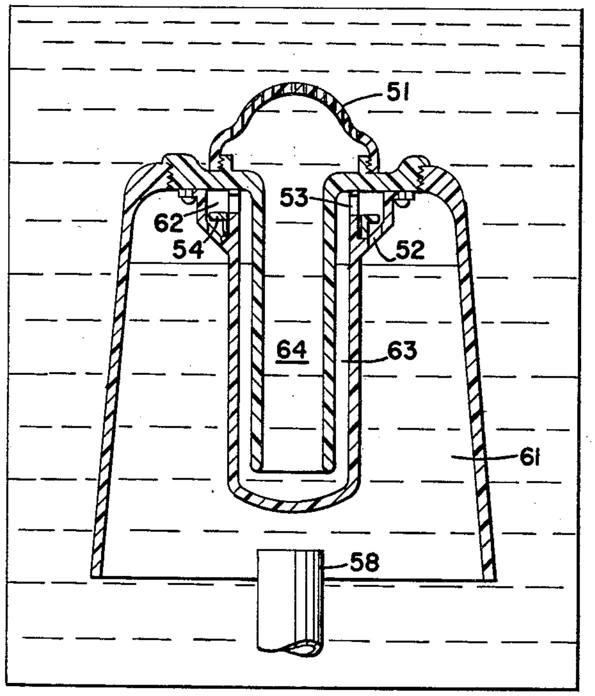
FIGS. 10 and 11 are views similar to FIG. 9 but show the unit at different stages in a cycle of operation.
Figure 11:
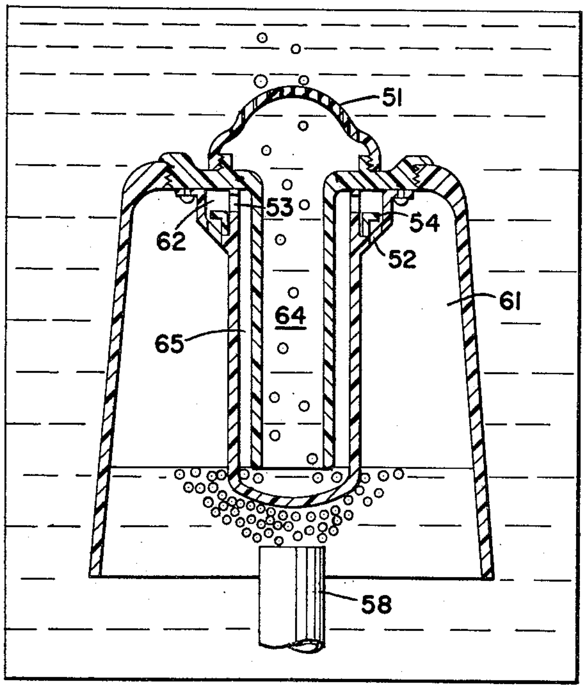

When it is desired to create the air screen for calming the waves approaching the equipment to be protected, the valve 38a will be opened while the valve 39 will remain closed. This will bring about delivery of air through the branch line 42, reducing valve 43, and hose line 44 to the passage 19. The passage 19 may have become filled with water during the submersion operation through the access provided by the metering discs 60 of the various units 30. The air delivered to the passage 19 will first serve to remove this water and then deliver air through the metering discs 60 into the interior of the shells 45. At this time the units will be substantially filled with water except for a small amount of air which may be entrapped at the tops of the chambers 61 and 62 indicated in FIG. 9. At this time the ring 54 will have been lifted by the water into the position indicated in FIG. 9 so as to close off the openings 53, but the chamber 62 will be in communication with the main chamber 61 through the openings 52. As the air under pressure rises within the chamber 61 it will gradually accumulate at the top and force the water downwardly within the shell. As the water level within the shell is lowered the ring 54 will be lowered and will eventually open up completely the passages 53. At this time the continued delivery of air will not only continue to lower the level of the water within the chamber 61 but also within the annular channel 63, as indicated in FIG. 10. Continued delivery of air serves to force the water level down to the point indicated in FIG. 11 which serves to open up the mouth of the chamber 64 within the tube 47. When this is achieved there will be a sudden rush of air under pressure from within the shell 45. This air will pass through the openings 52 and 53 and downwardly through the channel 63 and then upwardly through the chamber 64. In the latter it will mix with the water column still present therein and create an aerated mass of water which, because of its lower density than the surrounding water, will rise and be emitted upwardly through the openings in the cap 51 with a mushrooming effect in the manner indicated in FIG. 9. In the course of expelling the air in this manner, the water will quickly rise within the chamber 61 to a level close to the top of the latter and in doing so will lift the valve ring 54 into the position shown in FIG. 9, thus closing off the openings 53. The device is now ready for a repetition of the same operation.

It will be understood that the devices 30 distributed along the length of the pipeline will all operate in the same manner each operating independently of the other so that they do not discharge the air simultaneously but all discharge a given amount of air at periodic intervals the duration of which is determined by the rate of discharge of air through the orifice disc 60. In the normal use of the equipment it is desirable to have such air discharge take place from each unit about every 3 to 7 seconds, depending upon the conditions being encountered. The air mixed with the water thus rising from the bottom of the harbor to the top serves to provide an air screen which has a remarkable calming action upon the waves at the surface of the water.

As the mixture of air and water is periodically released from each of the units 30 throughout the length of the pipeline, the rising current of bubbles, forming in effect a curtain or screen, has a tendency to spread both longitudinally and transversely of the pipeline so that as the mixture of air and water reaches the surface of the body of water a relatively large area, having substantial length and width, is placed in a state of turbulence which has a remarkable effect upon the destructive or disturbing actions of the wave movements. Preferably the waves are largely reduced to a surf-like condition before they reach the dredge or other object to be protected.

The frequency of the discharge of air from each unit may be varied to suit the requirements at any particular time by regulating the reducing valve 43 and simultaneously controlling the speed of the compressor to meet the demand. Also it is possible to vary the frequency of discharge, in the use of the equipment under different conditions, by changing the metering discs 60 to suit the requirements of a particular situation. The pressure of the air delivered to the passage 19 through the reducing valve should always be sufficiently greater than the hydrostatic pressure at the level of the lowermost air releasing unit in the series that air will be discharged into said unit, and in fact all of the units, at a desired rate. The extent to which the air pressure exceeds such hydrostatic pressure at each unit will determine the rate of flow of the air through the orifice in the disc 60 of each unit and thus determine the time interval between successive discharges of air. In some instances in which long, relatively small diameter hose or pipelines are employed in this portion of the system, the reducing valve may be omitted or by-passed.

If desired, the units 30 on the opposite sides of the main pipeline need not be disposed in pairs having their axes in the same plane transverse to the pipeline. Those on one side of the pipeline may be located intermediate those on the opposite side. For this purpose the frame construction 29 may be modified to enable the frame as a whole to be disposed at an angle of 45° to the axis of the pipeline or it may be so modified that each frame extends outwardly toward only one side of the pipeline, at right angles to the axis thereof, alternate frames extending in one direction and the others extending in the opposite direction from the pipeline. The T-fittings 33 in this event will be replaced by elbow fittings. The disposition of the units 30 on one side of the pipeline midway between those on the opposite side of the pipeline, in the direction of the axis of the latter, has certain advantages with respect to the character of the air screen formed. Whatever arrangement is employed it is important that the structure as a whole is balanced about the axis of the main pipeline and has its center of gravity below such axis. This is necessary to insure against tilting of the frame structure carried by a certain pipe section and turning of the pipe section as would be readily permitted by the ball joint couplings between the same and the adjacent pipe sections.

Referring now to FIGS. 12–17, inclusive, there is shown a modified construction of the pipeline and its attachments for producing the air bubble screen in accordance with the invention. An important advantage of the modified construction is that it reduces the overall height of the apparatus which is submerged and thus enables use of the equipment in harbors having little more than the depth required for the maximum draft vessels which enter the harbor. The arrangement is such that the maximum vertical dimension of the equipment is no greater than the diameter of the ball joint couplings for the main pipeline sections.

Figure 17:
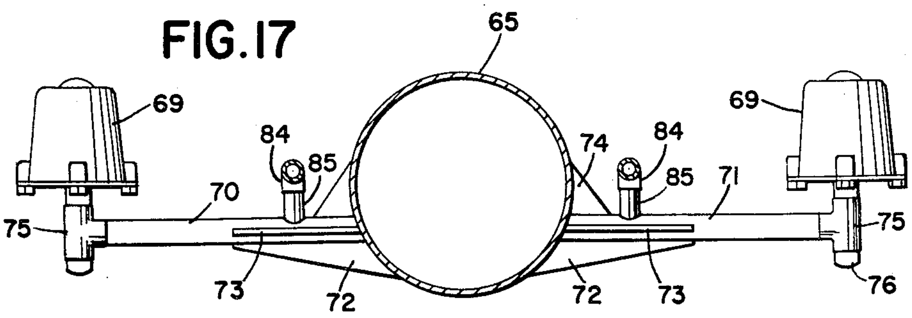
FIG. 17 is a transverse sectional view through the modified form of pipeline in the region of a pair of the air releasing units and shows the means for supporting and supplying air to such units.

The modified system comprises a series of pipe sections two of which are shown at 65 and 66. These may suitably be each 96 feet in length. Successive sections are connected by substantially airtight and watertight ball joints provided by members 67 and 68 similar to members 13 and 14 of the first embodiment. These are assembled and held together in the same manner as explained in connection with the first embodiment. At suitable spacings, say 8 feet, along the pipeline there are provided along each side thereof units 69 similar to the air releasing units 30 of the first embodiment. The units 69 are carried by pipes 70 and 71 extending horizontally from the main pipe sections at right angles to the axis thereof, as shown in FIG. 17. These pipes are welded to the main pipe section, such as 65, at points well below the horizontal plane extending through the axis of the main pipe section. They are braced and firmly retained on the main pipe section by means of brackets or plates 72, 73 and 74 which are welded to the main pipe section and to the pipes 70 and 71, the plates 72 and 74 being disposed vertically and the plates 73 being disposed horizontally. In this way a firm and rigid connection of the pipes 70 and 71 with the main pipe section is provided. At the outer end of each of the pipes 70 and 71 there is provided a T-fitting 75 the bottom of which is closed off by a screw cap or plug 76. The upwardly extending arm of the T-fitting is arranged to receive a sleeve 77 extending downwardly from a three-armed spider 78 which is suitably secured, as by welding, to the sleeve 77. The latter may be firmly connected with the T-fitting 75 in any suitable way as by the provision of a small telescoping nipple or pipe section received within the sleeve 77 and also within the upper arm of the T-fitting. Any other suitable means for providing a firm and airtight connection of the parts may be employed. Each of the units 69 is provided with an outer shell similar to the shell 45 of FIG. 5 and this, adjacent its lower end, is provided with three outwardly extending ears 79 arranged to cooperate with the arms of the spider 78 and adapted to be secured to the latter by screws 80. The upper end of sleeve 77 is closed by a ring or disc 81 carrying at its center a metering disc 82. The latter has a discharge opening at its center which may be of different diameter for different units, thus enabling the delivery of air at substantially the same rate to all of the units along the length of the pipeline in spite of their varying distances from the source of compressed air.

For delivering air to the pipes 70 and 71, and hence to the units 69, there is provided a small pipeline 83 at each side of the main pipeline 65, 66, etc. The pipelines 83 are secured to the equipment at each of the pipes 70 or 71 throughout the length of the system by means of T-fittings 84 provided at these points in the pipelines 83. T-fittings 84 are in turn connected with the upper ends of the short, upwardly extending pipes 85 projecting from the pipes 70 and 71. To permit angular movement of one main pipe section, such as 65, in relation to another, such as 66, at the ball joint coupling, a flexible hose line 86 is provided to interconnect the adjacent ends of the successive sections of the small pipelines 83 carried by the main pipe sections. These hose lines 86 may be formed of flexible metal or of polyethylene. In fact, the pipelines 83 may also be formed of polyethylene, if desired, in order to reduce to a minimum the danger of clogging the air line through the accumulation of corrosion particles and the like therein resulting from the introduction of water through the metering discs when no air is being delivered through the air lines while the apparatus is submerged. However, if the pipelines 83 are formed of polyethylene it may be desirable to provide bracing members formed of angle irons or the like, between successive pipes 70 on one side and successive pipes 71 on the other to render greater rigidity to the structure. If the pipelines 83 are formed of metal on the other hand, they will provide adequate rigidity to the structure. Also, to eliminate corrosion problems, the pipes 70 and 71 may be replaced by polyethylene or other plastic tubing, and in this event metal frames may be provided to extend outwardly from the main pipeline sections to carry the plastic tubing and also the air releasing units.

As explained in connection with the first described embodiment of the invention, the pipes 70 and 71, or the suggested substitute structure, may be arranged to extend outwardly from the main pipeline in such a way as to position the air releasing units on one side of the main pipeline intermediate those on the opposite side of the pipeline in the direction of the axis of the latter. This, in the illustrative example, will provide an air releasing unit every four feet along the length of the main pipeline. Good results may be obtained if the spacing of the units is increased to six feet.

Figure 12:
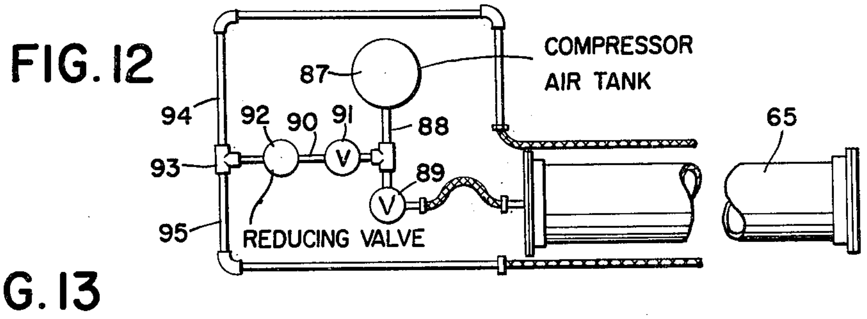
FIG. 12 is a schematic view showing the means for delivering air under pressure to a modified form of pipeline and related parts.
Figure 13:
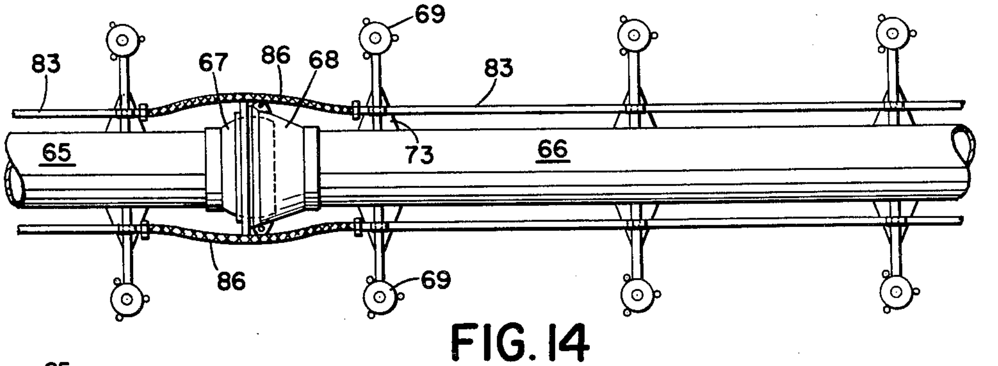
FIG. 13 is a plan view of a portion of the modified pipeline with its air screen producing units.
Figure 14:
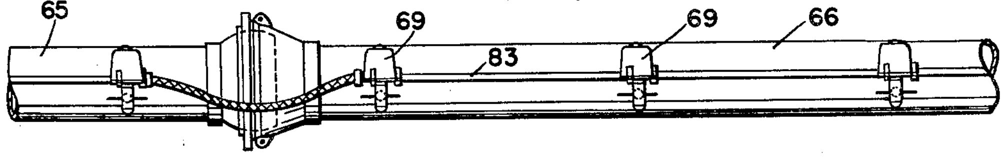
FIG. 14 is a side elevational view of the parts shown in FIG. 13.
Figure 15:
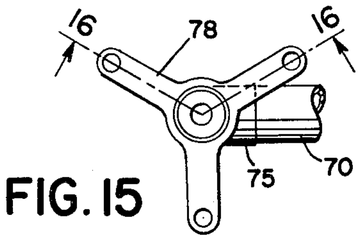
FIG. 15 is a plan view of a spider-like bracket used to support an air releasing unit.
Figure 16:
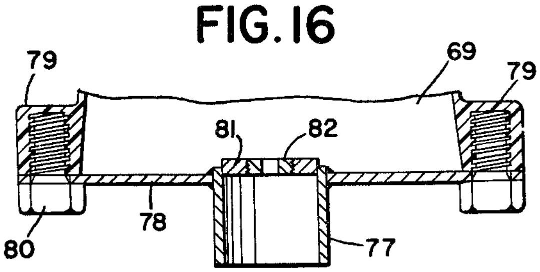
FIG. 16 is a sectional view taken along the broken line 16—16 of FIG. 15 showing the manner of mounting the unit on the spider-like bracket.

As shown in FIG. 12, the system includes an air tank 87 connected with a compressor of suitable capacity to supply the air necessary for the flotation of the main pipeline 65, 66, etc. and for operation of the units 69. This equipment, as in the case of the first embodiment, is preferably carried by a barge located adjacent one end of the main pipeline. Air is delivered from the tank 87 through a line 88 to a valve 89 and from the latter to the center of the first main pipe section 65. The connection with the latter may be similar to that shown at 40 in FIG. 8. It will be understood that valve 89 is mounted on the barge and serves to control the delivery or cutting off of the supply of air to the main pipeline. Between the valve 89 and the main pipeline there is provided a suitable length of flexible hose to connect line 88 with the pipe section 65 when the latter is submerged to the bed of the harbor in a position in which its free end is spaced a suitable distance horizontally from the barge to avoid any interference with the latter. A branch line 90 from the line 88 is arranged to receive air from the tank 87 when a valve 91 is opened. In the line 90 there is preferably provided a pressure reducing valve 92 which enables reduction of the pressure of the air from that in the tank 87, say 125 lbs. per sq. in., to that desired for delivery through a T-fitting 93 and branch lines 94, 95 to flexible hose lines connected with the near ends of the pipelines 83 carried by pipe section 65. The desired pressure for this purpose will vary, as explained in connection with the first embodiment, but should ordinarily be such as to maintain a pressure of about 30 lbs. per sq. in. at the most remote air release unit 69.

The operation of the modified system is substantially the same as explained for the first embodiment. By operation of the valve 89 air may be admitted to the main pipeline 65, 66, etc. to expel the water therefrom and to raise it to the surface whenever it is desired to move the equipment from one location to another. When the main pipeline has been raised to the surface the far end may be hoisted on to a boat and either retained there during transportation, or it may be capped in the manner explained in connection with the first embodiment and then returned to the water, so that the pipeline will remain afloat as it is towed to a new location. A suitable number of tug boats should be provided to maintain the pipeline in a substantially straight condition as it is being towed and to position it properly at a new location. When it reaches the new location, the cap is removed from the far end of the main pipeline and the latter is permitted to fill with water and thus again submerge the equipment to the bed of the harbor. The hose connecting the compressor system with the main pipeline will at this time be disconnected from the source of air supply to permit the escape of air from the main pipeline, or a special valve may be provided for this purpose. It will be understood that during the sinking operation the valve 89 will be closed so that no air is delivered beyond this valve. Now the system is ready for the creation of the desired pneumatic breakwater by opening the valve 91 to provide a continuous supply of air at the desired pressure to all of the units 69. The air so delivered will be periodically released by each of the units 69 at suitable intervals in the same manner as explained in connection with the first embodiment.

While several illustrative embodiments of the invention have been described in considerable detail, it will be understood that various changes may be made in the construction and arrangement of the component parts of the system within the scope of the appended claims. Also it should be understood that the various dimensions and conditions of operation specified are by way of illustration and subject to variation to meet the requirements of varying situations.

What is claimed is:

1. A portable pneumatic breakwater which comprises a continuous pipeline, said pipeline having a passage therethrough which is open at one end of the pipeline to admit water thereto when submerged in a body of water, means for producing air under pressure and introducing the same into said passage at the opposite end of said pipeline, means carried by said pipeline at spaced points throughout its length for releasing air under pressure for upward movement through said body of water to produce an upward current in the region of said pipeline, conduit means separate from said passage through the pipeline for delivering air under pressure to said last-mentioned means, and means for controlling, at will, the delivery of air to said passage through said pipeline from said first-mentioned means under such pressure and in such manner as to displace from the passage through said pipeline the water admitted thereto through said open end, said passage having such volume capacity as to cause said pipeline and said means carried thereby to be floated when the water is displaced from the passage through said pipeline, thereby enabling said pipeline to be towed to a new location.

2. A portable pneumatic breakwater according to claim 1 in which said means carried by said pipeline for releasing air under pressure comprises a plurality of discharge units, each of said units having openings for the free admission of water thereto upon submersion in a body of water and being adapted to discharge air upwardly therefrom at periodic intervals when supplied continuously with air under a pressure exceeding that of the hydrostatic pressure of the water at the depth to which said unit is submerged.

3. A portable pneumatic breakwater according to claim 1 in which said pipeline is formed of elongated sections of pipe interconnected by substantially watertight ball joints to provide a breakwater of the desired length and flexibility and allowing for a breakwater of almost any desired shape.

4. A portable pneumatic breakwater according to claim 3 in which the means carried by each section of the pipeline for releasing air is so mounted that the center of gravity of each section is below the axis of the ball joint at each end of the section.

5. A portable pneumatic breakwater according to claim 3 in which the pipeline and said means carried thereby have a maximum vertical dimension approximately equal to that of the ball joint connection between two of said sections of pipe.

6. A portable pneumatic breakwater according to claim 2 in which said means for delivering air under pressure to said discharge units is so constructed and arranged as to deliver the air at substantially the same rate to each of the units throughout the length of the pipeline.

7. A portable pneumatic breakwater in accordance with claim 2 in which said means for delivering air under pressure to said discharge units comprises control means at each of said units for determining the rate of delivery of air to the unit.

8. A portable pneumatic breakwater in accordance with claim 7 in which said control means is provided with a metering orifice for determining the rate of delivery of air to the related unit, said metering orifices for the plurality of units carried by said pipeline being of such varying cross-sectional area as to bring about delivery of air at substantially the same rate to each of the units throughout the length of the pipeline.

9. A portable pneumatic breakwater in accordance with claim 2 in which said pipeline is formed of metal and resistant to substantial flexing, and said units are formed primarily of a lightweight plastic.

10. A portable pneumatic breakwater in accordance with claim 2 in which said pipeline is formed of interconnected sections of steel pipe and said units are formed primarily of polyethylene.

11. A portable pneumatic breakwater according to claim 10 in which rigid bracket means are connected with said pipeline for supporting said units, said bracket means extending outwardly from the pipeline at spaced points along the latter, the longitudinal axes of said bracket means being disposed below the horizontal plane extending through the longitudinal axis of the pipeline.

12. A portable pneumatic breakwater according to claim 11 in which each of said brackets includes piping which forms part of the means for delivering air to the related unit.

13. A portable pneumatic breakwater according to claim 12 in which said conduit means for delivering air to said units comprises a walled-off portion within each section of said pipeline and flexible tubing for interconnecting the adjacent ends of the walled-off portions of successive sections of said pipeline.

14. A portable pneumatic breakwater according to claim 12 in which said means for delivering air to said units comprises piping extending along each side of said pipeline externally thereof, said last-mentioned piping being connected with the piping forming part of said brackets.

15. A portable pneumatic breakwater according to claim 14 in which said piping extending along the pipeline is formed in sections, each of said sections extending along a section of the pipeline and terminating inwardly of each end of the latter, and flexible tubing of interconnecting the adjacent ends of successive sections of said piping.

References Cited in the file of this patent

UNITED STATES PATENTS

| | | |
|---|---|---|
| 843,926 | Brasher | Feb. 12, 1907 |
| 1,264,756 | Begg | Apr. 30, 1918 |
| 1,391,922 | Brasher | Sept. 27, 1921 |
| 1,716,616 | Brasher | June 11, 1929 |
| 2,967,399 | Laurie | Jan. 10, 1961 |

FOREIGN PATENTS

| | | |
|---|---|---|
| 805,789 | Great Britain | Dec. 10, 1958 |